(12) United States Patent
Jooste et al.

(10) Patent No.: US 7,472,828 B2
(45) Date of Patent: Jan. 6, 2009

(54) SYSTEM AND METHOD OF MANAGING A TICKET ORDER

(75) Inventors: Jeffrey Jooste, Fox Island, WA (US); Sheila A. Babine, Arlington, MA (US); Perry Clifton Hart, Jr., Coto de Caza, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/607,439

(22) Filed: Dec. 1, 2006

(65) Prior Publication Data

US 2007/0145111 A1 Jun. 28, 2007

Related U.S. Application Data

(60) Provisional application No. 60/741,361, filed on Dec. 1, 2005.

(51) Int. Cl.
*G06F 7/08* (2006.01)
(52) U.S. Cl. .................. 235/381; 235/383; 235/375
(58) Field of Classification Search .............. 235/375, 235/379, 381, 383, 385, 462.01
See application file for complete search history.

(56) References Cited

U.S. PATENT DOCUMENTS

| 5,930,810 A | * | 7/1999 | Farros et al. ................ 715/201 |
| 2005/0162689 A1 | * | 7/2005 | Roztocil ..................... 358/1.15 |

* cited by examiner

*Primary Examiner*—Uyen-Chau N Le
*Assistant Examiner*—Tuyen K Vo
(74) *Attorney, Agent, or Firm*—Kriegsman & Kriegsman (57) ABSTRACT

A system for managing the production of retail tickets in accordance with a ticket order includes a ticketing services bureau adapted to receive the ticket order and a print center to print tickets in accordance with the ticket order. The system additionally includes a client connected to the ticketing services bureau via an electronic network. As part of an interactive ticket proofing process, the client is capable of electronically retrieving an on-screen ticket proof from the ticketing services bureau and, if necessary, dynamically modifying the on-screen ticket proof in real time. The ticketing services bureau then generates an output data file based on the original ticket order, the edited on-screen ticket proof and print characteristics of the printer that will execute the ticket order. In this manner, the print center uses the output data file to generate tickets that closely resemble the on-screen ticket proof approved by the client.

14 Claims, 10 Drawing Sheets

FIG. 1

PRIOR ART

SYSTEM AND METHOD OF MANAGING A TICKET ORDER

CROSS-REFERENCE TO RELATED APPLICATIONS

The present application claims the benefit under 35 U.S.C. 119(e) of U.S. provisional Patent Application Ser. No. 60/741,361, filed Dec. 1, 2005, the disclosure of which is incorporated herein by reference.

BACKGROUND OF THE INVENTION

The present invention relates generally to the retail industry and more particularly to ticketing services in the retail industry.

An article of commerce is typically delivered from a supplier (e.g., a brand owner or vendor) to a buyer (e.g., a retailer) through a multi-stepped process which is commonly referred to in the art as the retail supply chain. Specifically, referring now to FIG. 1, there is shown a simplified block diagram of one common version of the retail supply chain, the retail supply chain being identified generally by reference numeral 11. In the first step of supply chain 11, a retailer 13 places a purchase order (i.e., an order to purchase product at a specified price) with a supplier 15, the purchase order placement step being represented generally by arrow 17. In response thereto, supplier 15 instructs a manufacturing facility 19 (e.g., a factory) to manufacture the particular product for purchase in accordance with the purchase order, the instruction step being identified generally by arrow 21.

In the retail industry, articles of commerce (as well as their corresponding shipping cartons) are traditionally provided with one or more forms of identification media (also referred to herein simply as tags, tickets or labels) to communicate pertinent information relating to the articles. For example, an article of clothing is commonly provided with a permanent label, fabric label or a woven label which may inform a consumer of, among other things, the name of the manufacturer and/or instructions for washing the article. As another example, an article of clothing is commonly provided with a removable price tag which is designed for separation from the article after purchase, the removable tag informing a consumer of, among other things, the price, size and style of the article at the point-of-sale. As yet another example, a carton (or other similar type of shipping container) is often provided with an adhesive-backed label to display, inter alia, pertinent shipping information relating to the carton as well as information relating to the contents contained therein. It is to be understood that use of the terms "tags", "tickets" and "labels" are used interchangeably herein and are meant to encompass all well-known forms of identification media.

Figure 1:
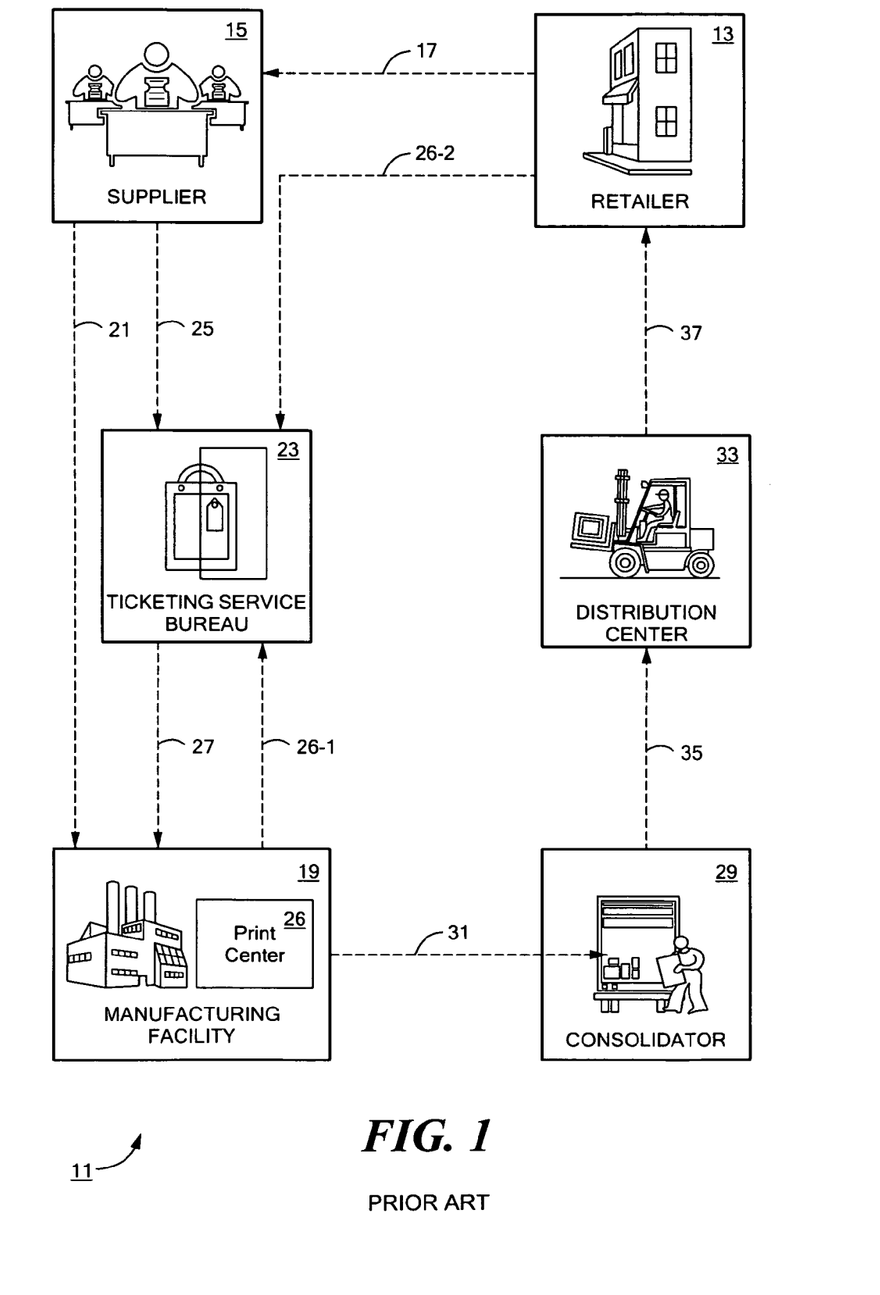
FIG. 1 is a simplified block diagram of a prior art version of the retail supply chain.

Accordingly, it should be noted that, as part of step 21, supplier 15 may additionally instruct manufacturing facility 19 to manufacture any tickets that are to be used in conjunction with the manufactured articles, such as shipping labels, price tags, etc. (In the present patent application, references to "manufacturing" and "production" of tags, labels or tickets signify the imprinting and/or encoding of these media, not the fabrication of the media.). However, as can be appreciated, the production costs associated with the printing, sorting, packing and shipping of individual labels (e.g., labor, equipment and facilities) are often too large for a product manufacturing facility to absorb. As a result, many retail companies often out-source either a portion or all of their ticketing services to a specialist in the ticketing industry. Avery Dennison Corporation of Pasadena, Calif., is widely regarded as an innovator and pioneer in the retail ticketing services industry. TICKET EXPRESS™, which is a well-known retail ticketing service presently commercialized by Avery Dennison Corporation, utilizes a network-based ticketing system to promote efficient and accurate ticket production and management services.

As a result, if manufacturing facility 19 is not suitably equipped to meet the ticketing demands of the purchase order, the ticketing services may be alternatively directed to a ticketing service bureau 23 that specializes in retail ticketing services (e.g., Avery Dennison Corporation's TICKET EXPRESS™ retail ticketing service bureau). It is to be understood that the ticket request placed with ticketing services bureau 23 is typically placed by either supplier 15 (as represented by arrow 25 in FIG. 1), manufacturing facility 19 (as represented by arrow 26-1 in FIG. 1) or retailer 13 (as represented by arrow 26-2 in FIG. 1).

Having received the ticketing requests for the purchase order, ticketing service bureau 23 instructs an affiliated print center 26 to generate all the necessary tickets for the purchase order, the ticket generation instruction being represented generally by arrow 27. In the present example, the affiliated print center 26 is located at manufacturing facility 19. However, it is to be understood that print center 26 may alternatively be located anywhere outside of manufacturing facility 19.

Once completed, the manufactured tickets are directed to the packing/shipping warehouse for manufacturing facility 19 where the tickets are then affixed to the products or product cartons for sale. At this time, manufacturing facility 19 carries out its product packing process.

The packaged articles are then transferred from manufacturing facility 19 to a freight consolidator 29 for shipment, this transfer step being identified generally by arrow 31. In compliance with the purchase order, consolidator 29 then ships the packaged articles to a specified retailer distribution center 33 (e.g., a retailer warehouse) in the most efficient and economically advantageous manner, as represented generally by arrow 35 in FIG. 1. The packaged articles are then delivered from distribution center 33 to retailer 13, the delivery step being generally identified by reference numeral 37. Once received at retailer 13, the product is then displayed for sale, thereby completing the closed-loop supply chain cycle.

As noted above, TICKET EXPRESS™ is a well-known retail ticketing service bureau which utilizes a network-based ticketing system to promote efficient and accurate ticket production and management services. Although well-known and widely used in commerce, most conventional network-based retail ticketing services suffer from a notable shortcoming.

Specifically, most conventional web-based retail ticketing services only provide a client with a ticket proof prior to printing which is generic in nature (i.e., which does not incorporate the variable information of the ticket order therein). As a result, the customer is not able to review an adequate representation of the ticket to be generated as part of the order but rather is only able to review a generic graphic that is akin to an entry in a product catalog. Without having the ability to review an accurate representation of the ticket prior to the ticket printing process, the customer may become dissatisfied with the finished product which, in turn, may necessitate a reprint of the ticket order, which is highly undesirable.

Accordingly, applicant has recognized that a specific benefit can be recognized by providing customers of web-based retail ticketing services with ticket proofs which accurately represent the ticket to be generated. As a result, the customer can actively participate in the design of the ticket prior to the printing process, which is a principal object of the present invention.

SUMMARY OF THE INVENTION

It is an object of the present invention to provide a new and improved system and method for managing the production of tickets in accordance with a ticket order submitted to a ticketing services bureau.

It is another object of the present invention to provide a system and method as described above which enables a client to electronically retrieve from the ticketing services bureau an on-screen ticket proof which accurately represents a ticket to be generated as part of the ticket order.

It is yet another object of the present invention to provide a system and method as described above wherein the on-screen ticket proof can be dynamically modified by the client prior to printing the ticket order.

Accordingly, as one feature of the present invention, there is provided a system for managing the production of tickets in accordance with a ticket order, said system comprising (a) a ticketing services bureau adapted to receive the ticket order and generate an on-screen ticket proof in accordance therewith, (b) a client connected to the ticketing services bureau via an electronic network, wherein said client is capable of retrieving the on-screen ticket proof from the ticketing services bureau and dynamically modifying the on-screen ticket proof so as to yield an edited on-screen ticket proof, and (c) at least one print center assigned by the ticketing services bureau to print tickets in accordance with the ticket order and the edited on-screen ticket proof, the at least one print center being connected to the ticketing services bureau via an electronic network.

As another feature of the present invention, there is provided a method by which a client may review a ticket proof generated by a ticketing services bureau, the client being connected to the ticketing services bureau by an electronic network, said method comprising the steps of (a) creating a dynamic, on-screen print proof at the ticketing services bureau, (b) electronically retrieving the dynamic, on-screen print proof from the ticketing services bureau by the client, (c) examining the on-screen ticket proof by the client, and (d) dynamically modifying the on-screen ticket proof by the client so as to yield an edited ticket proof that is retained by the ticketing services bureau.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 2:
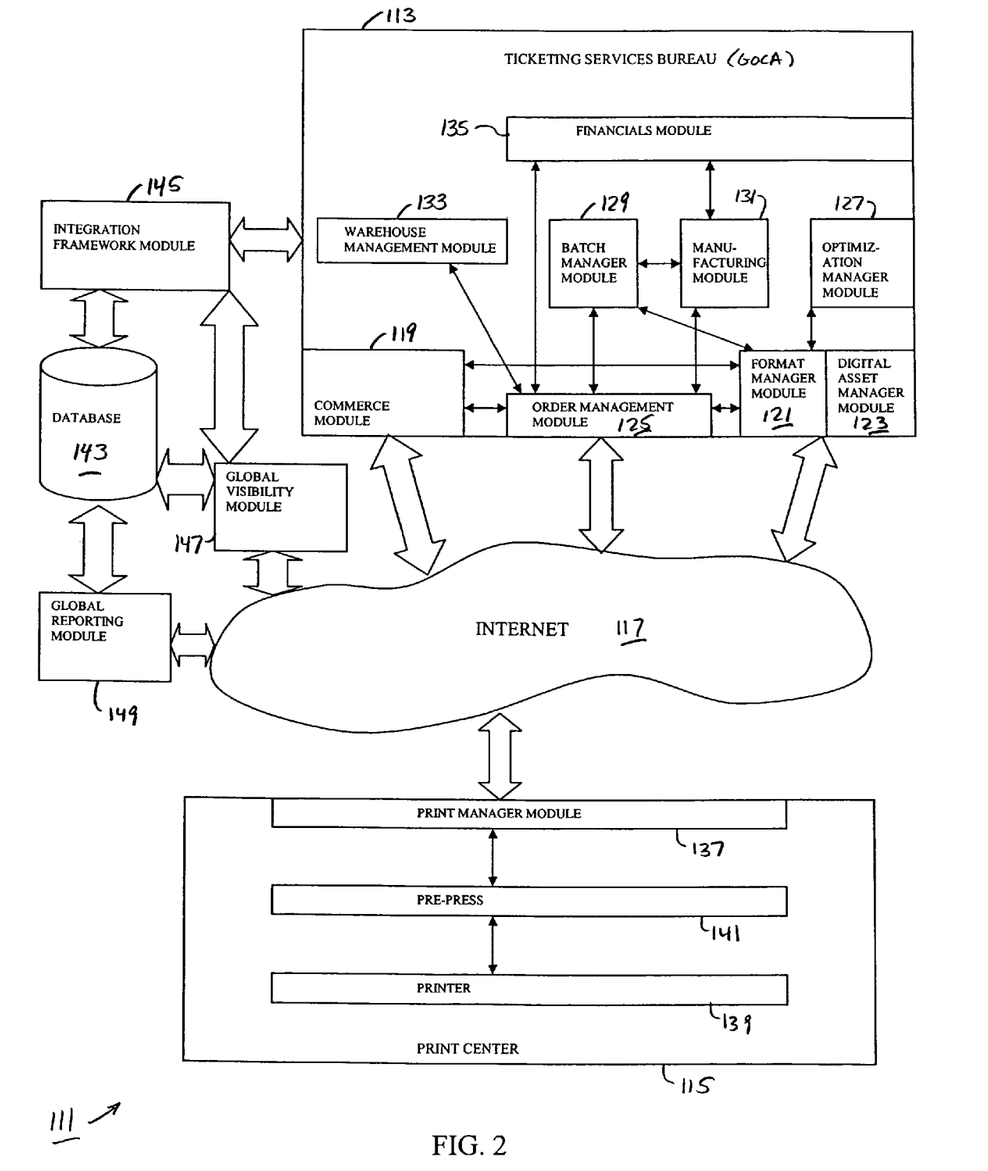
FIG. 2 is a schematic representation of a novel system for production of tickets for use in conjunction with the retail supply chain, the system being constructed according to the teachings of the present invention.

Referring now to FIG. 2, there is shown a detailed block diagram of a system for use in the production of tickets for supply chain articles of commerce, the ticketing system being identified generally by reference numeral 111.

Ticketing system 111 comprises a ticketing services bureau 113 which is electronically linked with at least one print center 115 via the internet 117 (or any other similar communication network). As will be described in detail below, ticketing services bureau 113 is designed to receive a ticket order (i.e., an order for the manufacture of customer-designed tickets) and, in turn, manage the production of said tickets in compliance with the ticket order.

It should be noted that ticketing system 111 is described herein in conjunction with the manufacture of tickets that are to be affixed to articles of commerce. However, it should be noted that ticketing system 111 is not limited to the management of the production of tickets that are to be affixed to articles of commerce. Rather, it is to be understood that ticketing system 111 could be used in conjunction with the management of the production of any printed item without departing from the spirit of the present invention.

It is to be understood that use of the term "tickets" in conjunction with system 111 is meant to encompass any well-known form of identification media that is provided with printed matter. In particular, system 111 is designed for use with either of the two following paradigms of identification media: (1) identification media with relatively standardized formatting attributes (e.g., font type, font size, printed matter layout, etc.), such as conventional price tickets and shipping labels, and (2) identification media with relatively unique formatting attributes, such as fabric labels or other similar types of media which allow for the customer to implement item-specific design characteristics thereto.

With respect to the first paradigm of identification media, it is to be understood that system 111 enables a customer to interactively modify non-stylistic attributes associated with a ticket, such as size, style, price, description code, country of origin, etc. However, the customer is not able to interactively modify stylistic attributes associated with a ticket, such as font type and/or font size, which are typically "givens" for a particular ticket type (e.g., conventional price tickets).

With respect to the second paradigm of identification media, it is to be understood that system 111 enables a customer to interactively modify most or all attributes associated with a ticket including, inter alia, the stylistic attributes associated with a ticket, such as font characteristics (e.g., font, type, font size, bold/italic/underline, scale, etc.) and layout (e.g., rotation, margins, field positioning, etc.).

It should also be noted that ticketing system 111 is represented herein as comprising a single print center 115 for purposes of simplicity only. In fact, it is to be understood ticketing system 111 preferably includes a plurality of print centers 115, wherein each print center 115 can be provided with a broad range of printing capabilities. For example, each print center 115 preferably provides at least some of the following capabilities: digital printing capabilities, thermal printing capabilities and offset printing capabilities. In this manner, ticketing services bureau 113 can select the appropriate print center 115 to execute the print order based on the geographic distribution of print orders (i.e., by locating the print center 115 closest to manufacturing facility 19), as will be described in greater detail below. The selection of a print center 115 to execute the print order also can take into account the printing capabilities of different print centers.

Ticketing services bureau 113 is a global ticket order management system and, as a consequence, is also referred to herein simply as a global order capture application (GOCA). GOCA 113 includes a plurality of modules for carrying out its various functions, each module including a collection of routines that perform a system-level function that may be dynamically loaded and unloaded from a running kernel as required. Preferably, GOCA 113 is designed to have an open architecture so as to allow for the addition, removal and/or replacement of the various individual modules as deemed necessary.

Specifically, GOCA 113 comprises a commerce module 119, a format manager module 121, a digital asset manager module 123, an order management module 125, an optimization manager module 127, a batch manager module 129, a manufacturing module 131, a warehouse management module 133 and a financials module 135. The details of each module will be described further in detail below.

Commerce module 119 is preferably run through an International Business Machines (IBM), Inc., WebSphere™ Commerce server and is responsible for, among other things, providing a means for supply chain clients as well as internal users (e.g., customer service personnel for the ticketing services bureau) to interface with GOCA 113. In this capacity, commerce module 119 effectively serves as an e-commerce storefront for ticketing services bureau 113. It should be noted that commerce module 119 is preferably designed to allow for the rapid development and deployment of new software to facilitate in the ordering process as well as to create customer-specific stores that can be maintained by the customer.

Format manager module 121 is preferably run using a custom Java solution that utilizes print-from-the-web (PFTW) technology. Format manager module 121 is responsible for, among other things, managing the design, layout and editing of the variable information relating to a ticket order (as well as the relationship of the variable information to pre-printed information). Examples of variable information that is commonly found on a ticket include price information, size information, style information and identification codes relating to the product to which the ticket is to be affixed. As will be described further in detail below, format manager module 121 is responsible for generating a web-based proof which (1) can be interactively reviewed and modified by the client, (2) accurately reflects the particular print characteristics of the target printer for the print job, (3) shows the relationship between the static and variable data, and (4) accurately reproduces images on finished tickets including pre-printed graphics and other stock elements, all of these features serving as principal novel features of the present invention.

Digital asset manager 123 is preferably run through a web-based enterprise application suite for digital asset management, such as Interchange Digital's Parts 3.0 application suite. Digital asset manager 123 is responsible for, among other things, the management of tag graphics that are often found on the front of a tag (e.g., artwork, tag design, etc.).

Order management module 125 is preferably run using a scalable back-end e-commerce infrastructure solution that provides comprehensive and flexible real-time order management, such as Yantra Corporation's PureCommerce software. Order management module 125 is responsible for, among other things, the overall management of the ticket order received by commerce module 119.

Optimization manager module 127 is preferably a custom Java-based solution that is responsible for, among other things, developing the most space-efficient (i.e., optimized) layout of tags on the substrate (e.g., sheet of paper) on which the tickets are to be printed.

Batch manager 129 is preferably a scheduling software tool that is responsible for, inter alia, optimizing the production of tickets at a selected manufacturing site by consolidating (i.e., batching) similar orders in production runs.

Manufacturing module 131 is a preferably a business logic software suite (e.g., Infor's SyteLine ERP solution) that is responsible for, inter alia, the print planning operations for GOCA 113, as will be described in detail below.

Warehouse management module 133 is preferably a software application that is responsible for, inter alia, the management of the delivery of manufactured tags to the warehouse facility 19 where, in turn, said tags are affixed to their associated products and packaged in compliance with specified packing instructions.

Financials module 135 is responsible for, inter alia, the management of invoices and related financial documents with respect to the ticket order. It should be noted that module 135 may be represented using a PeopleSoft financials system.

Print center 115 represents one available facility where tickets can be produced. Print center 115 includes a print manager module 137 which is preferably a custom solution that is responsible for, inter alia, managing print streams as well as the one or more printers 139 which are responsible for the actual printing of the tickets. Although print center 115 is represented herein as a single printer 139 for purposes of simplicity only, it is to be understood that each print center 115 is preferably provided with a variety of different printer types, such as thermal printers, laser printers, offset printers and/or digital printers, each printer having unique printing characteristics. It should be noted that, if print center 115 engages in flexographic and/or offset printing, print center 115 may additionally include a pre-press 141 for generating printing press plates.

Figure 3:
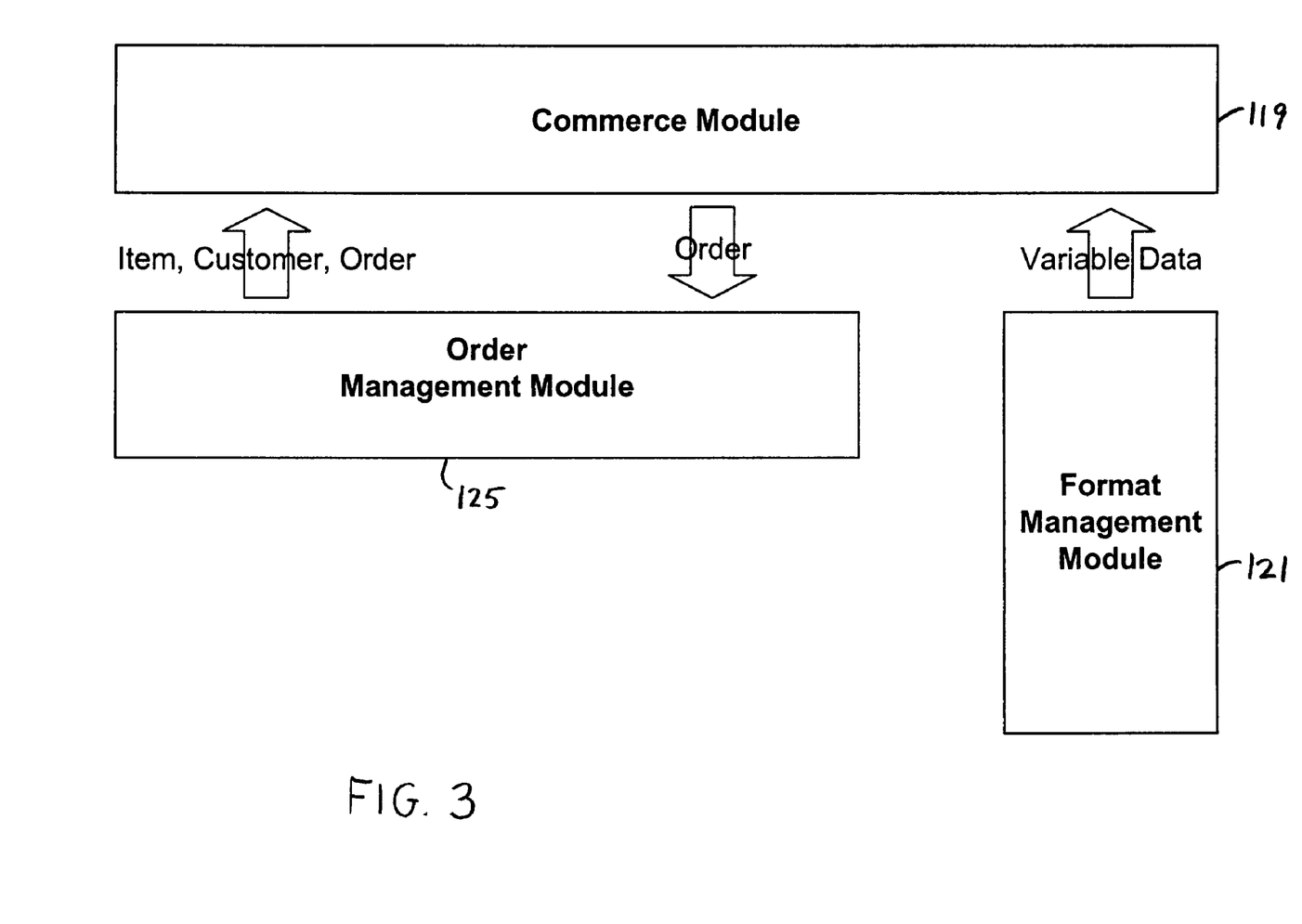
FIG. 3 is a schematic representation of selected modules of the system shown in FIG. 2, the schematic representation being useful in understanding how a ticket order is captured by the ticketing system of the present invention.

As will be described in detail below, system 111 is designed to undertake each of the tasks identified below:

Order Capture (i.e., Commerce Management) relates to the means by which customer systems are bridged, or linked, with GOCA 113. As noted above, commerce module 119 serves as the user interface (both internally and externally) for ticket order capture and, therefore, serves as the principal "store front" for web-based order placement. As seen most clearly in FIG. 3, the process by which a ticket order is captured includes the following steps:

(1) The supply chain customer (e.g., retailer 13, supplier 15, etc.) places a ticket order with ticketing services bureau 113. The customer may directly place the ticket order with GOCA 113 through commerce module 119 (i.e., through an internet-based store front), whereby customer-specific sales catalogs or websites that are stored within commerce module 119 are utilized to facilitate the order placement process. As an alternative, the customer may place a ticket order electronically via electronic data interchange (EDI). As another alternative, the customer may place a ticket order to a customer service representative for ticketing services bureau 113 by telephone or facsimile. In turn, the customer service representative manually enters the ticket order into GOCA 113 through commerce module 119.

(2) Once the ticket order is received, commerce module 119 standardizes the information in the ticket order.

(3) The standardized ticket order is then sent from commerce module 119 to order management module 125 which, in turn, assumes the remaining responsibility of managing the ticket order, as will be described in detail below.

(4) The non-variable information relating to the ticket order (e.g., customer name, order number, etc.) is sent back to commerce module 119 from order management module 125. Additionally, the variable field information relating to the ticket order (e.g., price, size and style information relating to an article of commerce) is first identified by format manager module 121. If it is a manual order entry, it is displayed by commerce module 119 for input. Commerce module 119 then captures the variable data entered by the user. Validation is then performed on the variable data information by format manager module 121 and the updated variable information is sent back to commerce module 119.

Commerce module 119 provides password-protected security for system 111, with role-based access for authorized supply chain participants (e.g., retailer 13, supplier 15, etc.). One of the advantageous features of the present invention is that because all ticket order information is sent to commerce module 119 as noted above, authorized supply chain participants can "call out" or otherwise review pertinent details relating to the placed order through commerce module 119, the "store front" for GOCA 113.

Figure 4:
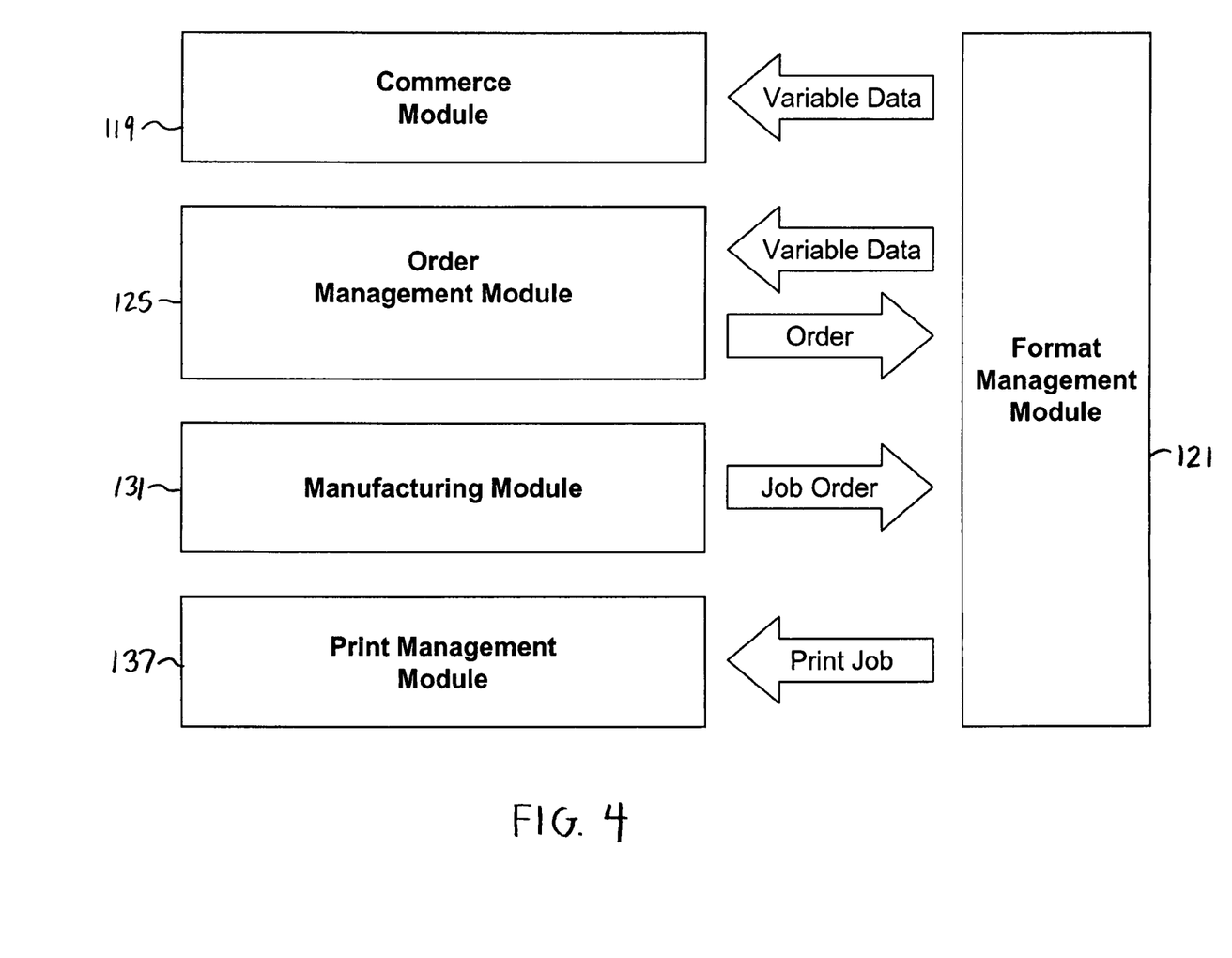
FIG. 4 is a schematic representation of selected modules in the system shown in FIG. 2, the schematic representation being useful in understanding how a ticket proof is generated and interactively reviewed by a client within the ticketing system of the present invention.

Ticket Proofing (i.e., Format Management) relates to the means by which the customer may review an electronic ticket proof file prior to ordering and, if necessary, directly modify any of the variable information associated therewith. In this manner, it is to be understood that the customer is provided with an interactive, dynamic web-based tag proofing system, thereby allowing for customer collaboration on tag design, which is highly desirable. As seen most clearly in FIG. 4, the process by which a ticket proof is created, reviewed and, if necessary, modified by the customer includes the following steps:

(1) Format manager module 121 identifies the variable and non-variable information from the ticket order using its ticket repository. The format manager module 121 then extracts the non-variable tag information for the ticket order. Examples of non-variable tag information may include standardized images for a ticket (e.g., stored graphics/artwork) as well as the overall specs of the tag (e.g., size, type, etc.).

(2) Format manager module 121 then retrieves the variable information relating to the ticket order. Examples of variable information collected by format manager module 121 include the non-stylistic attributes of a ticket order, such as the price, size, SKU and/or shipping information associated therewith.

Format manager module 121 also retrieves help text, prompts and other information relating to the ticket order (e.g., field length, min/max characters, and lists of values) and, in turn, provides said data to commerce module 119 in order to facilitate order capture. Further, format manager module 121 provides validation and catalog look-ups, and performs style and position attributes.

(3) The variable and non-variable information is used by format manager 121 to generate web-retrievable ticket images that can be proofed by the customer through commerce module 119. It should be noted that the ticket images are provided on dynamic screens which therefore allow for the customer to make immediate modifications. In this capacity, it is to be understood that format manager module 121 provides GOCA 113 with print-from-the-web (PFTW) capabilities, whereby a client located anywhere globally can design tickets using dynamic, web-enabled proofing screens.

(4) When the ticket proof has been approved by the client via commerce module 119, all of the variable ticket information associated with the order is sent from format manager module 121 to order management module 125.

It is to be understood that a physical ticket proof (i.e., a ticket sample) may be sent to the customer for review, if necessary.

System 111 permits graphic images to serve as variable information for a particular ticket order. System 111 allows the customer to interactively replace an image provided on a ticket proof. Information entered by the customer may identify the image directly (e.g., with an image file number), or indirectly (i.e., wherein the system generates the graphic image in response to other variable information provided by the customer, based upon rules in format manager module 121).

As a first example, a change of Style Number identifying types of shoes causes a graphic product image to change from a high-heel shoe to a golf shoe.

As a second example, a "color by size" color bar may serve as variable information for a particular ticket order. Specifically, a horizontal color bar may be provided on a price ticket to serve as a marker for the size of the article, wherein each size (small, medium, large, etc.) is represented by a particular color that is assigned using industry standards. As a result, using "color by size" color bars, consumers can find an article of a particular size by locating a particular color bar on the ticket (i.e., regardless of the retailer or merchandise brand).

This variable graphic image capability supports both the first paradigm of identification media, wherein stylistic attributes are highly constrained, and the second paradigm wherein customers are given more stylistic freedom.

Order Management relates to the means by which a ticket order is processed for ticket production. As seen most clearly in FIG. 5, the process by which a ticket order is processed for ticket production includes the following steps.

Figure 5:
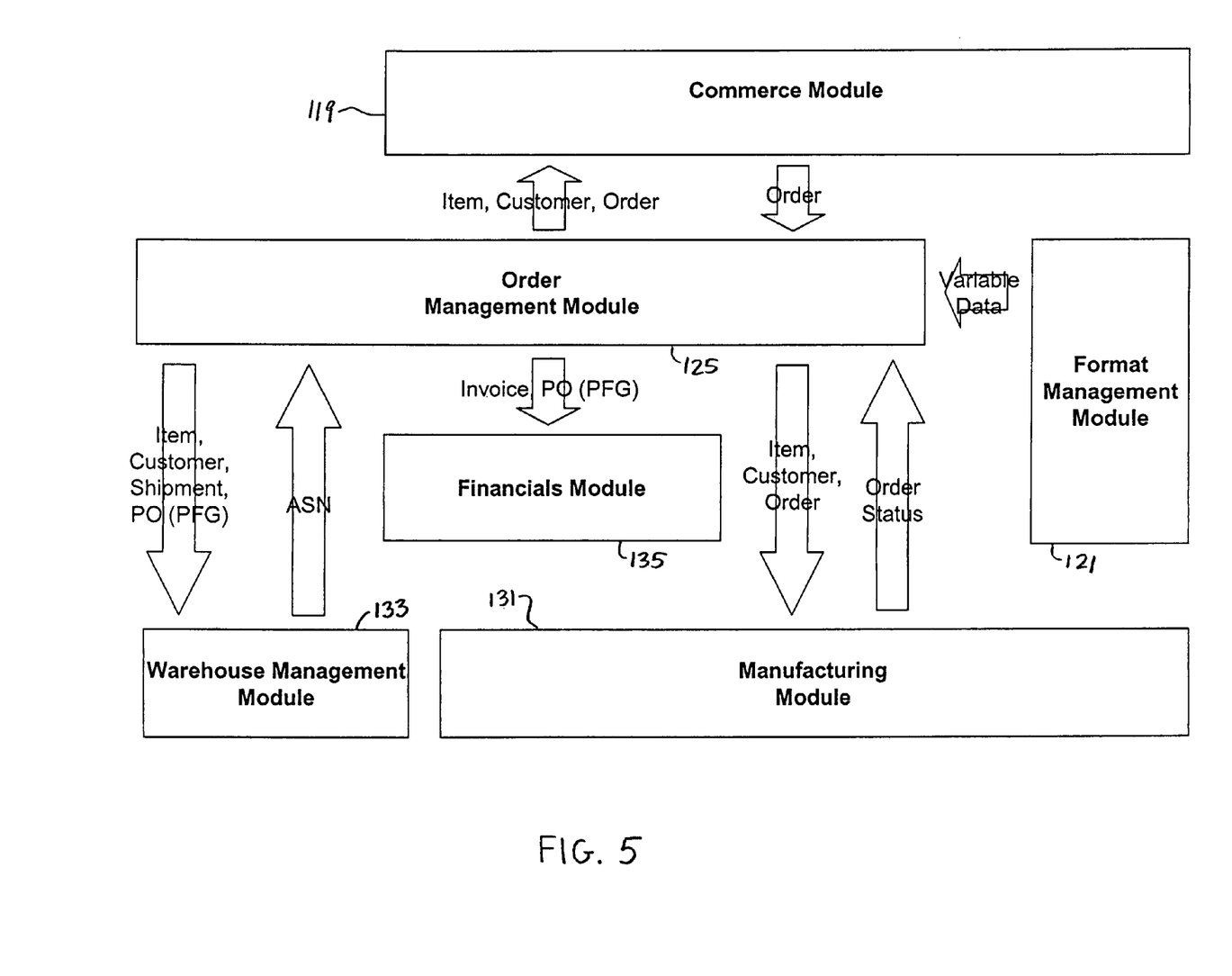
FIG. 5 is a schematic representation of selected modules in the system shown in FIG. 2, the schematic representation being useful in understanding how an approved ticket proof is then used to execute a ticket order by the ticketing system of the present invention.

(1) Having verified the ticket proof in the manner described above, the ticket order is released from order management module 125 to manufacturing module 131 for print planning. As will be described further below, manufacturing module 131, in turn, oversees the process of printing (i.e., filling) the ticket orders. At the same time, manufacturing module 131 provides order management module 125 with the frequent updates on the status of the pending ticket order.

(2) Financial information relating to the ticket order (e.g., invoice number, purchase order number) is released from order management module 125 to financials module 135 for management.

(3) As will be described further in detail below, order information used for tagging and packing purposes (e.g., item, customer, shipment and/or purchase order data) is released from order management module 125 to warehouse management module 133. In response thereto, warehouse management module 133 manages the processes of affixing the tickets to their corresponding articles, packaging the tagged products and generating advanced shipping notifications (ASN) relating thereto. Warehouse management module 133 then releases the advanced shipping notification (ASN) information back to order management module 125.

Figure 6:
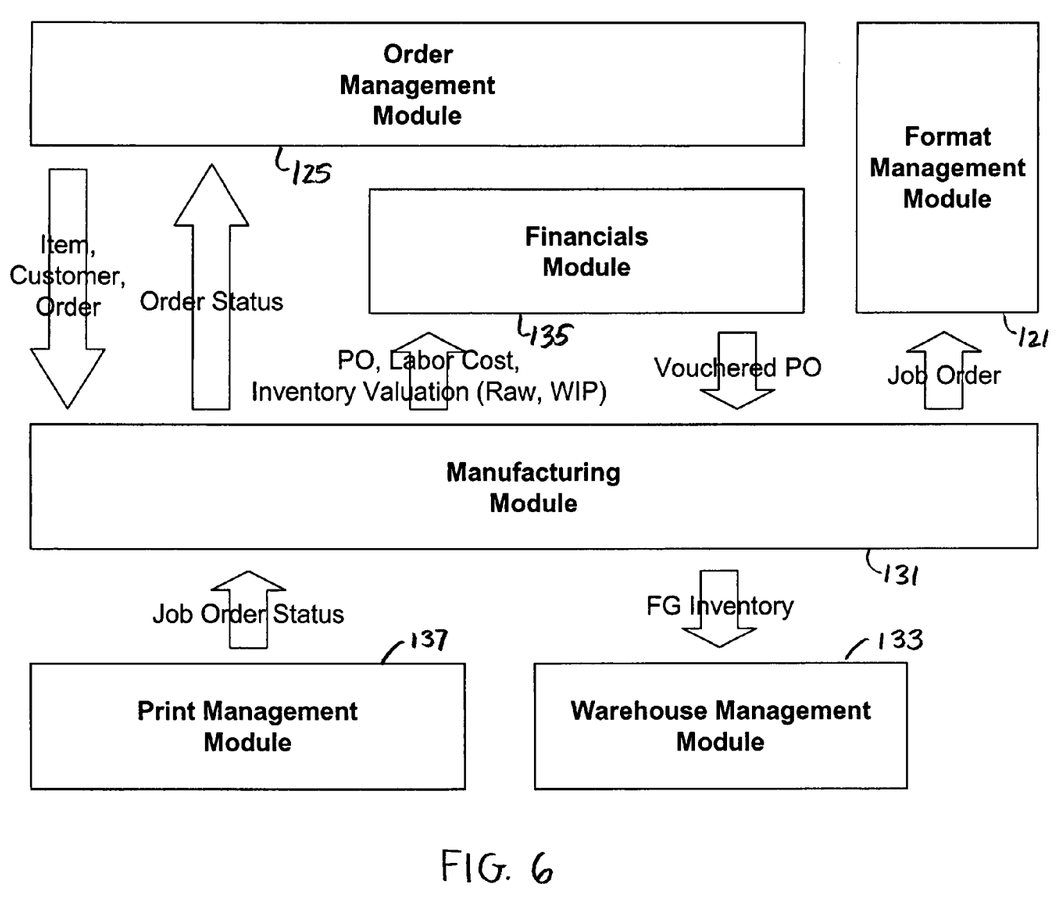
FIG. 6 is a schematic representation of selected modules in the system shown in FIG. 2, the schematic representation being useful in understanding how a ticket order is released for printing the ticketing system of the present invention.

Manufacturing Management relates to the means by which a ticket order is released for printing. As seen most clearly in FIGS. 2 and 6, the process by which a ticket order is released for printing includes the following steps:

(1) As detailed above, order management module 125 releases the ticket order to manufacturing module 131 for processing, the ticket order including at least some of the following information: the item number, customer number and order number associated therewith.

(2) Batch manager module 129 generates print job orders which, in turn, are released to format manager module 121 in order to generate detail specific print streams. As can be appreciated, the particular print streams are created to render the printing process more efficient and thereby more cost-effective. The print streams are then released to print manager module 137 by format manager module 121.

(3) Manufacturing module 131 additionally releases financial information relating to the print job order to financials module 135. Information released to the financials module 135 includes, among other things, purchase order information, labor costs and inventory valuation (e.g., Raw, WIP, etc.). In turn, the financials module 135 sends back to manufacturing module 131 a vouchered purchase order.

(4) Manufacturing module 131 additionally releases inventory information to warehouse management module 133 which utilizes the inventory information for warehouse management purposes.

(5) During the actual printing process (to be described in detail below), status of the print job is received by order management module 125 from print manager module 137. In this manner, order management module 125 can effectively manage the status of the released print order.

Figure 7:
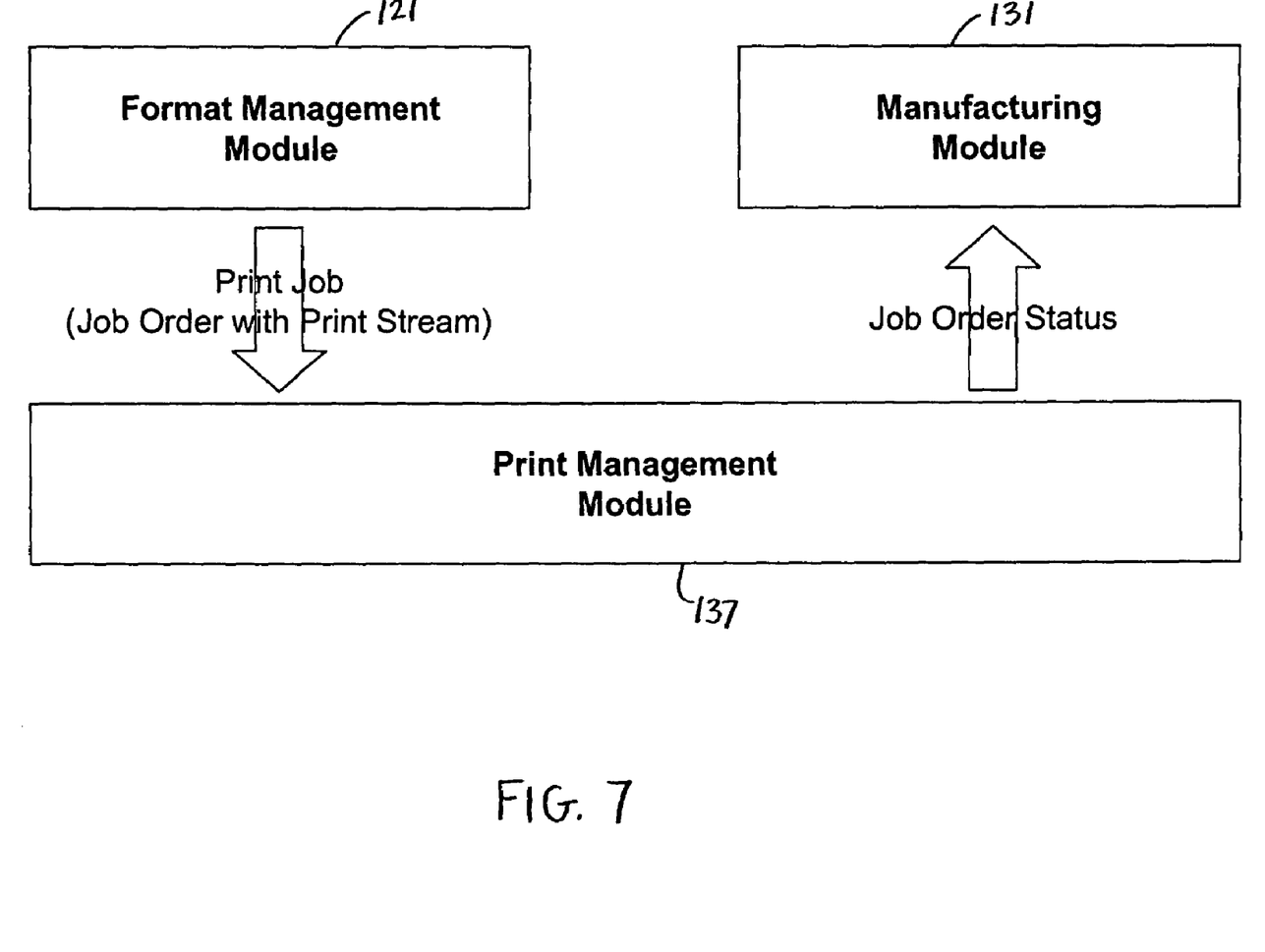
FIG. 7 is a schematic representation of selected modules in the system shown in FIG. 2, the schematic representation being useful in understanding how a released job order is printed at the print center.

Print Management relates to the means by which a released ticket order is printed at print center 115. It should be noted that, by decoupling the print management process from the manufacturing management process described above, the printing process can be standardized such that printing devices can be readily added, removed and/or replaced without compromising either process. In fact, multiple print centers 115 (each having multiple different printers, such as digital, offset and/or thermal printers) can interface with GOCA 113 to provide a wide range of printing capabilities at a wide variety of different geographic locations. As seen most clearly in FIGS. 2 and 7, the process by which a print job is executed includes the following steps:

(1) As noted above, a print job order, which details the specific print streams that are to be executed, is released from format management module 121 to print manager module 137 via the internet 117 or other similar network.

(2) In turn, print manager module 137 manages the release of the print job orders. Specifically, print manager module 137 oversees the print screen queuing for multiple printer types and releases the print screen data streams to applicable printer interfaces. Printer interfaces may include one or more of the following: (a) printer software; (b) pre-press software; and (c) direct interface with the printer. Furthermore, if printer 139 utilizes printing plates, print manager module 137 releases the print stream to pre-print software that manages the generation of printing plates at pre-press 141.

(3) Print manager module 137 additionally provides order management module 125 with periodic status information relating to the released print job orders.

Figure 8:
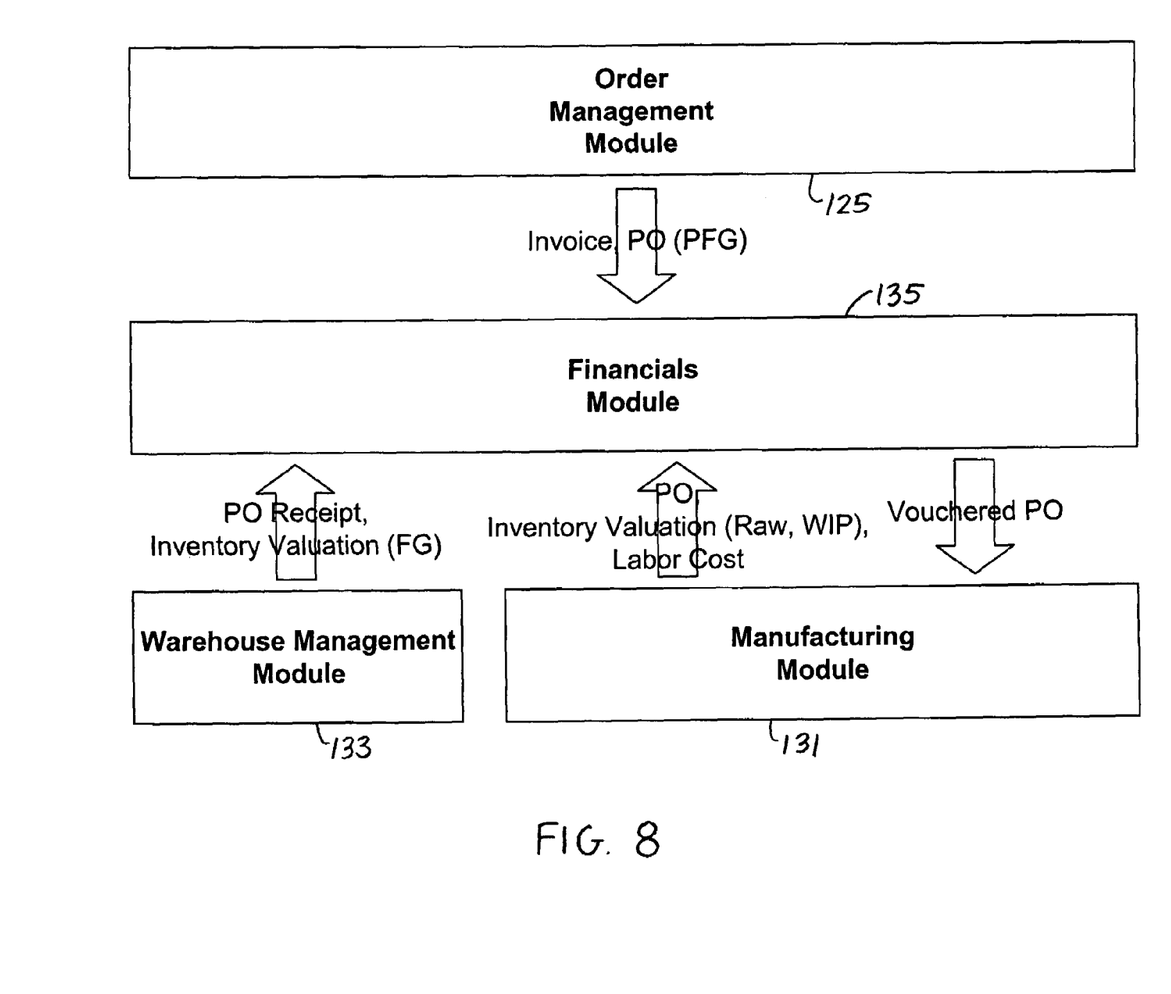
FIG. 8 is a schematic representation of selected modules in the system shown in FIG. 2, the schematic representation being useful in understanding how financial documents are processed by the ticketing system of the present invention.

Financials Management relates to the means by which financial documents relating to a ticket order is processed. As seen most clearly in FIG. 8, the process by which financial documents are processed includes the following steps:

(1) As noted above, financial information relating to a ticket order (e.g., invoices, purchase orders, etc.) is released from order management module 125 to financials module 135 for management.

(2) In addition, manufacturing module 131 releases financial information relating to a job order to financials module 135. The types of information released to financials module 135 include purchase order information, labor costs and inventory valuation (e.g., Raw, WIP, etc.). Upon the receipt of this information, financials module 135 sends back to manufacturing module 131 a vouchered purchase order.

(3) When production of the tickets for the ticket order has been completed, warehouse management module 133 provides financials module 135 with purchase order information relating to the tickets, such as purchase order receipts and inventory valuation (FG).

Figure 9:
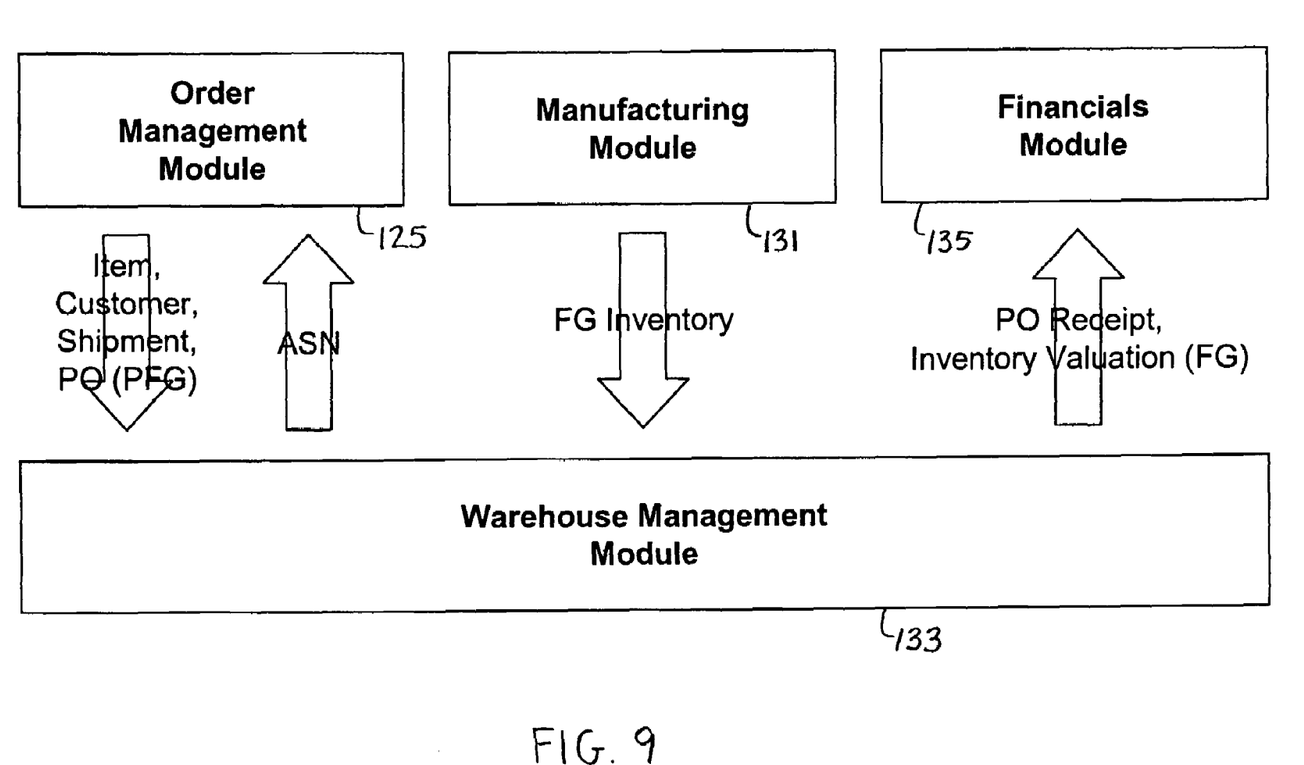
FIG. 9 is a schematic representation of selected modules in the system shown in FIG. 2, the schematic representation being useful in understanding how generated tags are affixed to articles of commerce and packaged in accordance with the client-specified instructions.

Warehouse Management relates to the management of the process in which generated tags are affixed to products and then packaged in compliance with client-specified packing instructions. As seen most clearly in FIG. 9, the process by which warehouse management module 133 controls the packing and shipping of tagged articles includes the following steps:

(1) As noted above, information relating to the ticket order that is to be used for packing and shipping purposes (e.g., packing instructions, item identification, customer name and shipment/purchase order information) is released from order management module 125 to warehouse management module 133. In addition, manufacturing module 131 releases FG inventory information to warehouse management module 133.

(2) Having received the aforementioned information from order management module 125 and manufacturing module 131, warehouse management module 133 manages the process by which manufactured tickets are affixed to related articles. In addition, warehouse management module 133 oversees the packing and shipping of the ticketed articles in compliance with packing and shipping instructions. When the packing process has been completed at manufacturing facility 19, warehouse management module 133 releases an advanced shipping notification (ASN) back to order management module 125.

(3) Furthermore, warehouse management module 133 releases financial information relating to the packaged and shipped articles (e.g., purchase order receipts, inventory valuation (FG)) to financials module 135.

Data Storage relates to the means by which relevant ticket order information is aggregated within a globally accessible database 143. Specifically, as seen most clearly in FIG. 2, a standard integration framework module 145 collects data from GOCA 113 in near real-time. In addition, integration framework module 145 is designed to receive data from any other affiliated ticketing systems. Stated another way, integration framework module 145 serves to collect data from GOCA 113 as well as any legacy ticketing service systems (i.e., systems prior to GOCA 113) in order to create a single, comprehensive and all-encompassing database 143, which is highly desirable.

Integration framework module 145 is based on service-oriented architecture (i.e., a collection of services that communicate with one another and which are self-contained in nature) and business process management (i.e., a set of activities which organizations can perform to either optimize their business processes or adapt them to new organizational needs). Preferably, integration framework module 145 is in the form of a Yantra Service Definition Framework.

Integration framework module 145 standardizes data as it is collected and, in turn, stores the standardized data in database 143 in near real-time. Database 143 preferably includes an operational data store (ODS), which is a temporary, or interim, database that stores time sensitive operational data that is to be accessed quickly and efficiently (e.g., data received within the last 30-60 days), and a data warehouse, which is a long-term database that stores historical data (i.e., data received over a period of years).

A global visibility module 147 is a web-based application that is connected to database 143, global visibility module 147 serving to organize business information for participants of the supply chain through a single user interface (i.e., "single sign-on"). In this manner, global visibility module 147 provides global access to pertinent business information (order info/status, inventory, sales numbers, etc.) to authorized personnel. Global visibility module 147 is preferably provided using a WebSphere Portal and provides windows into disparate information systems, like PeopleSoft and Yantra.

A global reporting module 149 is similarly a web-based application that is connected to database 143. Global reporting module 149 is preferably provided by Hyperion Performance Suite and makes the following types of reports available for review via the internet 117: (i) sales data (by product and customer); (ii) inventory data; (iii) service metrics; (iv) profitability information (by product and customer); (v) data models; (vi) analytic reports; (vii) data mart "builds"; and (viii) credit management.

Figure 10:
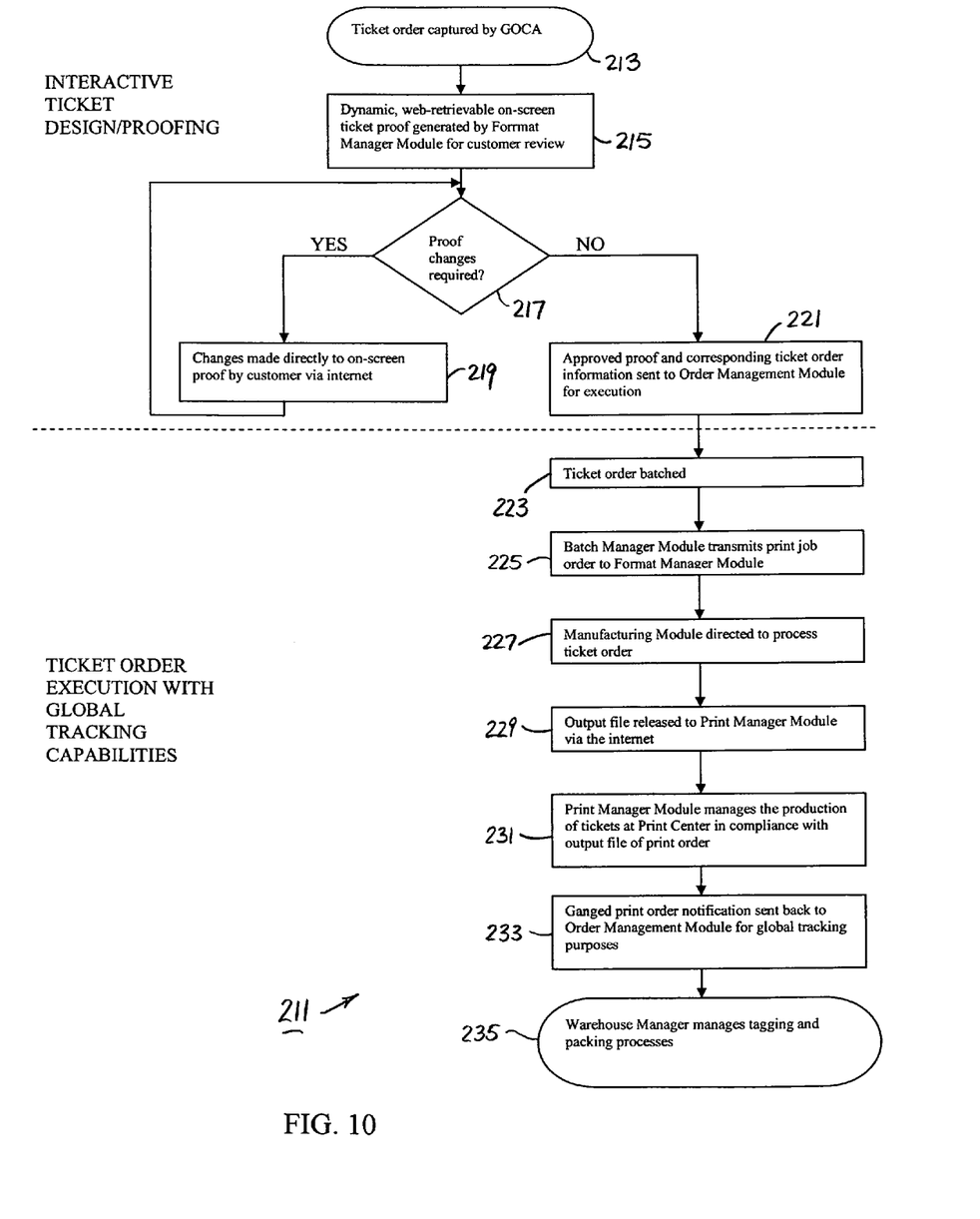
FIG. 10 is a flow chart depicting the process by which the ticketing system shown in FIG. 2 provides ticket management services for the retail supply chain.

Summarization of Overall Ticket Order Managment Services Provided by GOCA 113. Referring now to FIG. 10, there is shown a flow chart depicting the process by which GOCA 113 provides ticket management services for the retail supply chain, said process being identified generally by reference numeral 211. As will be described in detail below, process 211 provides a customer of the retail supply chain with (1) interactive customer ticket proofing/design, (2) globally visible ticket order information, and (3) printer-neutral management of variable ticket data, each of the aforementioned features serving as principal novel features of the present invention.

Process 211 commences when a ticket order placed by the customer is electronically captured into GOCA 113 through the web-based storefront (i.e., commerce module 119), said order capture step being represented generally by reference numeral 213. It should be noted that the order is preferably electronically received by commerce module 119. However, it is to be understood that the order may be placed via alternative means of communication (such as by FAX, email, telephone, etc.) and in an additional step manually keyed into commerce module 119 by customer service representatives for GOCA 113 (e.g., through the main storefront in commerce module 119 or through a specially-designed customer service storefront in commerce module 119). In the order, the template for the particular style of ticket to be printed is located in GOCA 113. Preferably, the following information is included in the order: (i) the customer; (ii) the order line; (iii) format number (i.e., the tag design); and (iv) variable data to be incorporated on the tag. Once received, commerce module 119 redirects (i.e., transfers) the ticket order to format manager module 121 for validation; then if the ticket order is validated, the order is transferred to order management module 125.

As noted above, ticketing services bureau 113 utilizes specified modules to generate a dynamic, on-screen ticket proof that can be reviewed by the client globally via the internet 117, the generation of said dynamic, on-screen ticket proof being identified generally by reference numeral 215. In addition, format manager module 121 serves to, among other things, retrieve any variable information associated with the tag proof, such as price, size, style, "color by size", etc. As a result, a web-based ticket proof is generated which the client can review through commerce module 119.

With the ticket proof generated, the customer is then afforded the opportunity to determine whether any changes to the proof are required, said determination step being represented generally by reference numeral 217.

If alterations to the tag proof are deemed necessary, the client can edit the variable data of the on-line ticket proof via commerce module 119 as a screen that passes into the format manager module 121, said editing step being identified generally by reference numeral 219. It should be noted that any changes made with respect to the ticket proof in step 219 are reflected in the on-screen image of the tag in real-time. As a result, the customer is instantly provided with an on-screen image of the edited proof which, in turn, can be examined to ascertain whether any additional editing is required. In this manner, the customer is able to interactively design a web-based proof which will accurately depict the particular tag to be produced as part of the initial ticket order. As can be appreciated, this ability of GOCA 113 to provide its customers with a dynamic means of interactive tag review serves as a principal novel feature of the present invention.

As noted briefly above, the types of information which are to be categorized as variable data (and therefore capable of being modified during the dynamic proofing process) are largely dependent on the type of identification media to be generated by ticketing services bureau 113. Applicant has recognized two distinct paradigms of identification media which can be generated by ticketing services bureau: (1) identification media with relatively standardized formatting attributes (e.g., font type, font size, printed matter layout, etc.), such as conventional price tickets and shipping labels, and (2) identification media with relatively unique formatting attributes, such as fabric labels or other similar types of media which allow for the customer to implement item-specific design characteristics thereto.

With respect to the first paradigm of identification media, it is to be understood that system 111 preferably affords the customer to interactively modify non-stylistic attributes associated with a ticket, such as size, style, price, description code, country of origin, etc. To the contrary, the customer is not able to interactively modify stylistic attributes associated with a ticket, such as font characteristics (e.g., font type, font size, bold/italic/underline, scale, etc.) and layout (e.g., rotation, margins, field positioning, etc.), which are typically "givens" for a particular ticket type (e.g., conventional price tickets).

With respect to the second paradigm of identification media, it is to be understood that system 111 preferably enables a customer to interactively modify multiple attributes associated with a ticket including, inter alia, the stylistic attributes associated with a ticket, such as font characteristics (e.g., font type, font size, bold/italic/underline, scale, etc.) and layout (e.g., rotation, margins, field positioning, etc.).

Once the ticket proof has been approved by the client via commerce module 119, all of the variable ticket information associated with the ticket proof is sent from format manager module 121 to commerce module 119 which, in turn, sends it to order management module 125 where the information is bundled together with the original ticket order data, said sending step being identified generally by reference numeral 221 in FIG. 10. It should be noted that, although the format information associated with the ticket design is sent to order management module 125, the visual (i.e., digital) component of the approved tag can be retained within commerce module 119 (i.e., for future review by authorized parties).

With the design of the ticket having been approved in the manner as described above, the process by which the ticket order is executed follows herewith.

The order management module 125 oversees the batching process for the ticket order, said step being identified by reference numeral 223 in FIG. 10. Specifically, order management module 125 directs batch manager module 129 to manage order batching (i.e., grouping together similar ticket orders in order to minimize printing costs). In addition, format manager module 121 directs optimization manager module 127 to optimize the layout for printing by (1) determining the number of tags for each order that should be printed based on the layout from format manager module 121, and (2) minimizing the number of printing plates that will be needed.

Acting on instructions from order management module 125, batch manager module 129 then transmits a print job order (in compliance with the batching process executed in step 223) to format manager module 121, the transmission step being identified generally by reference numeral 225. With the ticket order having been batched, format manager 121 calls optimization manager 127, if applicable, and takes the variable and non-variable data and generates an output file of the ticket design. It should be noted that order management module 125 determines which print center 115 is most aptly suited to generate the tickets and, in accordance therewith, format manager module 121 creates the output file in the particular format and layout required by the selected (i.e., target) printer 139. A very useful feature of the present ticket order processing system is that if it is necessary to change the printer or layout, format manager 121 automatically generates the output data file.

Order management module 125 then instructs manufacturing module 131 to process the print order, said instruction step being identified by reference numeral 227.

When printing is to be performed using non-digital printing means (e.g., offset printing, flexographic printing, etc.), format manager module 121 produces a completed output file (e.g., a .pdf-type file) which includes, inter alia, page size, layout, margins, columns, number of ups, all graphics, fonts and other similar items needed for the printing press. It is also important to note that format manager module 121 separates this information into distinct plate layers for the printing device, thereby resulting in significant time and cost saving advantages.

It should further be noted that, for offset production, the output file generated by the format manager module 121 is run through the software for producing the physical plates used by the offset printing press. It is to be understood that format manager module 121 handles the process of displaying which batches/orders are ready to be released (including due dates, number of plates, colors, quantity, etc.) and then, upon direction of the operator, releases or routes the .pdf file to the plate making software.

For digital printing processes, a similar output file is released by format manager module 121 directly to the printer or to any other front-end software that is needed, as will be described further below.

Based on instructions from order management module 125, format manager module 121 then releases the output file as an electronic data stream formatted for the target printer 139, the output file being released to the print manager module 137 of the selected print center 115 as part of a designated print stream, said releasing step being identified generally by reference numeral 229. Preferably, format manager module 131 utilizes an AS/2-type protocol for optimized security and guaranteed delivery.

Print manager module 137 then manages all of the various print streams received from ticketing services bureau 113, said management step being identified generally by reference numeral 231. Specifically, print manager module 137 oversees the print screen queuing for multiple printer types and releases the print screen data streams to applicable printer interfaces, printer interfaces including one or more of the following: (a) printer software, (b) pre-press software, and (c) direct interface with the printer. Furthermore, if printer 139 utilizes printing plates, print manager module 137 releases the print stream to pre-print software that manages the generation of printing plates at pre-press 141. It should be noted that, because print manager module 137 and format manager module 121 are separate yet interrelated modules, system 111 is able to support a wide variety of different printers, which is highly desirable.

At the same time that print manager module 137 releases ganged print orders to the appropriate printer interface, a notification relating to the ganged orders is sent back from print manager module 137 to order management module 125 in order to allow for the real-time tracking of relevant data with respect to the pending print order (e.g., status, labor information, etc), said step being identified generally by reference numeral 233.

To summarize, the format and print manager modules manage all of the steps that immediately precede the provision of the production ready file to the software responsible for actually driving the printing press (digital) or plate maker (offset). As a result, the best-of-breed software can still be used for this specific printing process.

Once the ticket printing process has been completed, warehouse management module 133 is instructed by order management module 125 to manage the tagging and packing operations at manufacturing facility 19, said step being identified generally by reference numeral 235. It should be noted that warehouse management module 133 provides pertinent packing information (e.g., advanced shipping notifications (ASNs)) to order management module 125 which are, in turn, globally retrievable by authorized participants of the supply chain for tracking purposes, which is highly desirable. At the same time, invoices may be sent by order management module 125 to financials module 135 for processing.

The embodiment shown in the present invention is intended to be merely exemplary and those skilled in the art shall be able to make numerous variations and modifications to it without departing from the spirit of the present invention.

As an example, the above-described method is described in conjunction with the production of tickets, tags, labels and the like. However, it is to be understood that the novel concepts described herein could be implemented with respect to any type of printed item without departing from the spirit of the present invention.

As another example, it is to be understood that modules in ticketing services bureau 113 could be added, removed and/or combined without departing from the spirit of the present invention.

All such variations and modifications are intended to be within the scope of the present invention as defined in the appended claims.

What is claimed is:

1. A system for managing the production of tickets in accordance with a ticket order, said system comprising:
   (a) a ticketing services bureau comprising a server, the server being adapted to receive the ticket order, store the ticket order as printer-neutral data which does not directly take into account the characteristics of any particular printing platform and generate an on-screen ticket proof in accordance therewith,
   (b) a client connected to the server via an electronic network, wherein said client can retrieve the on-screen ticket proof from the server and dynamically modify the on-screen ticket proof as deemed necessary so as to yield an approved on-screen ticket proof, and
   (c) a plurality of print centers which together include at least two distinct printing platforms, each printing platform having unique format and layout requirements, each of the plurality of printer centers being independently connected to the server via an electronic network,
   (d) wherein the server assigns a designated printing platform to the ticket order, selects a designated print center with access to the designated printing platform to print tickets in accordance with the ticket order, converts the accepted on-screen ticket proof into a production-ready output file in the format and layout required by the designated printing platform, and releases the output file to the designated print center for execution of the ticket order.

2. The system as claimed in claim 1 wherein the server is electronically linked to both the client and the plurality of print centers via the internet.

3. The system as claimed in claim 1 wherein the server comprises,
   (a) a commerce module through which the client may interface with the server
   (b) a format manager module for generating the on-screen ticket proof,
   (c) an order management module for managing the ticket order received by the server the order management module taking into account modifications made to the on-screen ticket proof by the client, and
   (d) a manufacturing module for processing the ticket order.

4. The system as claimed in claim 3 wherein each of the plurality of print centers comprises a print manager module and at least one printer.

5. The system as claimed in claim 4 wherein the server additionally comprises a batch manager module for generating a print job order based on the ticket order and the edited on-screen ticket proof.

6. The system as claimed in claim 5 wherein the format manager module releases the production-ready output file to the print manager module for the designated print center as part of a designated print stream.

7. The system as claimed in claim 6 wherein the print manager module for the designated print center releases ganged print orders to an appropriate printer interface for the printer.

8. The system as claimed in claim 7 wherein the ganged print orders are additionally sent by the print manager module for the designated print center to the server at the ticketing services bureau to allow for real-time tracking by the client.

9. The system as claimed in claim 3 wherein the on-screen ticket proof generated by the format manager can be reviewed and edited via said commerce module.

10. The system as claimed in claim 9 wherein modifications to the on-screen proof made by the client are reflected in real-time.

11. The system as claimed in claim 3 further comprising a central database for storing information relating to the ticket order.

12. The system as claimed in claim 11 wherein the database is electrically connected to the ticketing services bureau by means of an integration framework module.

13. The system as claimed in claim 12 wherein information located in the database is retrievable via the internet by means of a global visibility module.

14. The system as claimed in claim 12 wherein information located in the database is retrievable via the internet by means of a global reporting module.

* * * * *